US007478834B2

(12) United States Patent
Schlecht

(10) Patent No.: US 7,478,834 B2
(45) Date of Patent: Jan. 20, 2009

(54) MOVABLE CONCRETE PUMP COMPRISING A DISTRIBUTION BOOM

(75) Inventor: Karl Schlecht, Filderstadt (DE)

(73) Assignee: Putzmeister Concrete Pumps GmbH, Aichwald (DE)

( * ) Notice: Subject to any disclaimer, the term of this patent is extended or adjusted under 35 U.S.C. 154(b) by 615 days.

(21) Appl. No.: 10/559,065

(22) PCT Filed: Jun. 4, 2004

(86) PCT No.: PCT/EP2004/006024

§ 371 (c)(1), (2), (4) Date: Dec. 1, 2005

(87) PCT Pub. No.: WO2004/113646

PCT Pub. Date: Dec. 29, 2004

(65) Prior Publication Data

US 2006/0127230 A1 Jun. 15, 2006

(30) Foreign Application Priority Data

Jun. 25, 2003 (DE) ................................ 103 28 767

(51) Int. Cl.
*B62D 53/06* (2006.01)
*B60S 9/02* (2006.01)

(52) U.S. Cl. ................................ 280/763.1; 280/766.1

(58) Field of Classification Search .............. 280/763.1, 280/764.1, 765.1, 766.1; 212/175-300
See application file for complete search history.

(56) References Cited

U.S. PATENT DOCUMENTS

| | | | | |
|---|---|---|---|---|
| 3,224,597 | A * | 12/1965 | Whitmire | 212/294 |
| 3,822,791 | A * | 7/1974 | Eiler | 212/178 |
| 4,154,316 | A * | 5/1979 | Kokkila et al. | 180/14.1 |
| 4,165,005 | A * | 8/1979 | Jokinen | 212/304 |
| 4,418,713 | A * | 12/1983 | Schlecht | 137/351 |
| 5,029,895 | A * | 7/1991 | Anderson | 280/764.1 |
| 5,829,605 | A * | 11/1998 | Poitras | 212/180 |
| 6,390,504 | B1 * | 5/2002 | Fetzer | 280/763.1 |
| 6,631,817 | B1 * | 10/2003 | Fleagle et al. | 212/301 |
| 6,983,763 | B2 * | 1/2006 | Benckert et al. | 137/615 |
| 7,398,981 | B1 * | 7/2008 | Ener et al. | 280/86.5 |

FOREIGN PATENT DOCUMENTS

| | | |
|---|---|---|
| GB | 1 553 121 A | 9/1979 |
| WO | WO 94/08111 A1 | 4/1994 |

* cited by examiner

*Primary Examiner*—Christopher P Ellis
*Assistant Examiner*—Bridget Avery
(74) *Attorney, Agent, or Firm*—Patent Central LLC; Stephan A. Pendorf

(57) ABSTRACT

A movable concrete pump comprising a structural frame (14) that is mounted on a truck undercarriage (10) of a truck chassis (12), a boom stand (22) which is disposed on the structural frame (14) and can be rotated about a vertical axis (20), and a concrete distribution boom (24) embodied as a multi-member articulated boom. In order to be able to use a distribution boom having a great range, a trailer (34) is provided that has its own undercarriage (34) and is connected to the truck undercarriage (10) via a coupling member (36). The trailer (32) comprises a prop (40) which is rotatable about a vertical axis (38) and accommodates the set of arms that protrude from the rear end of the truck undercarriage (10) while driving on the road. The set of arms forms the coupling member (36) and encompasses a first boom arm (1) and additional boom arms (2 to 4) that are in a folded position relative to the first boom arm.

20 Claims, 1 Drawing Sheet

MOVABLE CONCRETE PUMP COMPRISING A DISTRIBUTION BOOM

CROSS REFERENCE TO RELATED APPLICATION

This application is a national stage of PCT/EP2004/006024 filed Jun. 4, 2004 and based upon DE 103 28 767.1 filed Jun. 25, 2003 under the International Convention.

BACKGROUND OF THE INVENTION

1. Field of the Invention

The invention concerns a mobile concrete pump with a structural frame mounted on the undercarriage of a truck chassis, supportable upon the ground with lifting up of the truck undercarriage, with a boom stand provided on the structural frame and rotatable about a vertical axis and a concrete distribution boom in the form of a multi-member articulated boom including a first boom arm pivotable at a first articulation linkage about a horizontal articulation axis relative to the boom stand and additional boom arms pivotable relative to each other at articulation linkages about the horizontal articulation axis.

2. Related Art of the Invention

Concrete pumps of this type receive concrete brought in to construction sites by transport vehicles, and convey the concrete via the distribution boom to a site in need of concrete. Conventionally the concrete pumps are mounted upon multi-axis vehicle chassis with continuous, rigid structural frames. For heavy vehicles with a total weight of greater than 24 tons multi-axle heavy duty chassis with high axle loads are necessary. These are allowed to travel upon public roads only with special permission and are not allowed to use many lightly paved roads and bridges. Further, in a self-propelled concrete pump of the above described type, it is known (EP-B-0038954) to use the semi-trailer of a tractor trailer rig as a structural frame for the concrete pump and the distribution boom. Therewith, while maintaining the prescribed weight limits, the total tractor trailer can achieve an increase in the reach of the distribution boom, and can do this without compromise or loss in stability despite the comparatively light weight construction of the semi trailer. This was accomplished in that the tractor trailer rig is lifted from the ground with its weight of approximately 7 to 9 tons used as ballast for stabilizing the distribution boom. However, here also the department of transportation regulations set a limit on the vehicle length and height, which impedes a further enlargement of the reach or range.

SUMMARY OF THE INVENTION

Beginning therewith, is the task of the present invention to so improve known mobile concrete pumps of the above described type in such a manner that, while maintaining within permissible axle loads and vehicle heights in the transport configuration, a significant increase in the range of the distribution boom can be achieved.

The inventive solution is based foremost on the idea that a trailer or follower is provided, which has its own undercarriage, which in the transport configuration can be connected with the truck undercarriage via a coupling member. The inventive trailer includes a pivot mount rotatable about the vertical axis for receiving a set of arms that protrude out from the rear end of the truck undercarriage while driving on the road, including a first boom arm and additional boom arms that are in a folded configuration relative to the first boom arm and form the coupling member. Thereby a significant increase in the range of the concrete distribution boom is achieved, wherein at the same time, in the transport configuration, the permissible vehicle length, vehicle height and axle load established by the department of transportation regulations is not exceeded.

In order to negotiate relatively tight curves without collision despite the greater vehicle length when in the transport configuration, it is proposed in accordance with a preferred embodiment of the invention, that in the configuration of travel the vertical axis of the boom stand and the pivot mount are designed as the rotation axis of the coupling member. A further preferred embodiment of the invention envisions that in the configuration of travel the first articulation linkage between the boom stand and first boom arm is freely pivotable about its articulation axis. Thereby it is achieved that the the truck chassis and the trailer chassis exhibit an optimal contact with the ground both when transitioning over a hill as well as when passing through a trough, and that an overloading of individual axles in uneven terrain is avoided. A further improvement in this respect is achieved thereby that also the pivot mount is limitedly pivotable about an axis running transverse to the trailer axis. Besides this, the pivot mount should be limitedly rotatable about the vertical axis of the trailer.

Basically it is conceivable that the trailer is supplementally coupleable with the truck undercarriage via a drawbar or towing bar. A further improvement in negotiating curves is achieved thereby, that the trailer is self steering. The trailer can, for this, include at least two preferably hydraulic coupled steering wheels. A further improvement is achieved thereby, that the trailer includes a steering device coupled electronically with the steering unit of the truck undercarriage.

In order to more easily maneuver the trailer in the decoupled state, it is advantageous when it includes a motorized wheel propulsion. Besides this, the vehicle propulsion can be active, which could be of significance above all in slippery environments.

In the operating configuration the set of arms which had been laid on the pivot mount is raised. A preferred embodiment of the invention envisions that the trailer includes a pump with a material supply container, which in the operating condition can be connected on the outlet side with a conveyor conduit provided on the distribution boom. The motor drivable hydraulic power unit for driving the pump is preferably located upon the structural frame associated with the truck undercarriage. For this purpose the structural frame is preferably divided in two along a parting line, wherein the front part of the structural frame is provided on the truck undercarriage of the truck chassis and carries the distribution boom, the front outrigger legs as well as the hydraulic unit, and wherein the rearward part of the structural frame is provided on the trailer and carries a pump unit with material supply container and the rearward outrigger legs. The hydraulic unit can therein be connected via flexible hydraulic lines with a hydraulic drive mechanism for the rearward outrigger arms provided on the trailer and for the pump unit.

In the operating condition the structural frame parts of the frame and the trailer are rigidly connected with each other. Besides this, at this time the pump unit is preferably automatically connected to the conveyor line associated with the distribution boom. Thereby the structural frame is supported in its totality upon the ground with the aid of the front and the rear outrigger legs with lifting of the truck undercarriage and the trailer undercarriage.

Preferably the distribution boom has at least four members. In the transport configuration on the road it is bolted to the pivot mount of the trailer. The trailer is designed to have at least two axles. Depending upon the size of the set of arms it would also be conceivable to use three to six axle trailers.

BRIEF DESCRIPTION OF THE DRAWINGS

In the following the invention will be described in greater detail on the basis of the illustrative embodiment represented in schematic manner in the figures. There is shown FIG. 1 A side view of a mobile concrete pump with a four-arm distribution boom in the configuration of road travel.

DETAILED DESCRIPTION OF THE INVENTION

Figure 1:
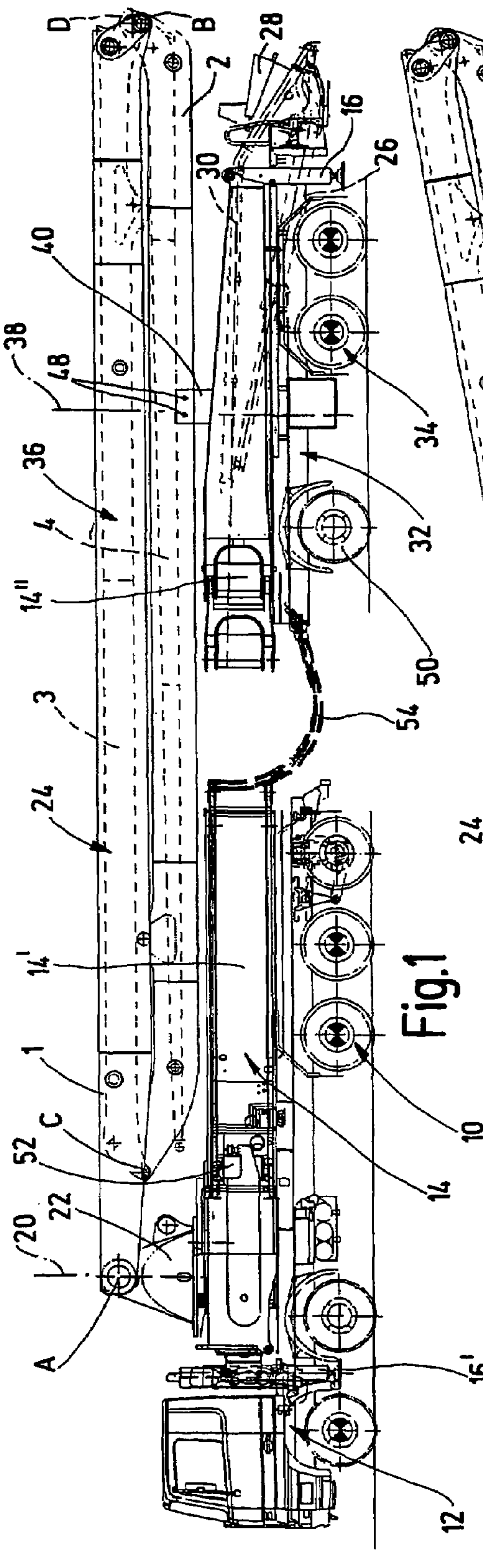
Figure 2:
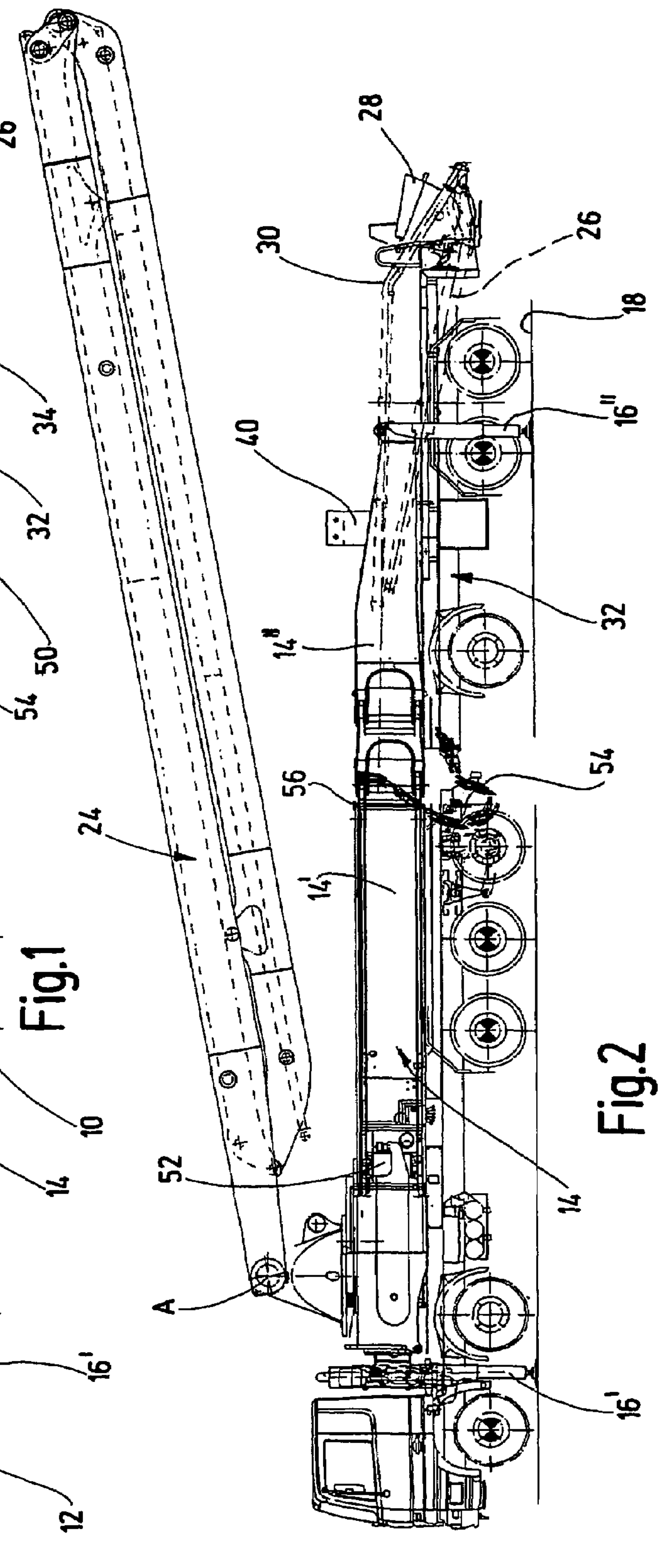
FIG. 2 A mobile concrete pump according to FIG. 1 in the operating configuration.

The mobile concrete pump shown in the figure includes a structural frame 14 mounted on a truck undercarriage 10 of a truck chassis 12. The structural frame 14 carries a boom stand 22 rotatable about the vertical axis 20 of the truck undercarriage 10, which carries a multi-member concrete distribution boom 24, which in the illustrative embodiment is a four member articulated boom. The articulated boom includes a first boom arm 1 pivotable relative to the boom stand 22 at a first articulation linkage A with horizontal axis of articulation and additional boom arms 2 to 4 pivotable relative to each other about horizontal articulation axis at articulation linkages B through D. In the transport configuration (FIG. 1) the boom arms are so folded together and positioned upon the truck undercarriage, that the vehicle length and vehicle height prescribed by department of transportation regulations are not exceeded.

One special feature of the invention is comprised therein, that the structural frame 14 is divided into two along a separation point or parting point 56 and that the mobile concrete pump in the configuration of travel on the road includes, besides the front part 14' of the structural frame 14 carrying truck undercarriage 10, a trailer 32, which has its own undercarriage 34 and carries the rear section of the structural frame 14". In the configuration of travel on the road the truck undercarriage 10 is connected with the trailer 32 via a coupling member 36. The trailer 32 includes a pivot mount 40 rotatable about the vertical axis 38 relative to the undercarriage 34 of the trailer, upon which, in the configuration of travel on the road, the section of the set of arms of the folded-together concrete distribution boom 24 projecting beyond the rearward end of the truck undercarriage 10 is supportable. The set of arms forms, in the folded together position of the boom arms, the coupling member 36 between the truck undercarriage 10 and the trailer 32.

The trailer 32 is designed to be self-steering. In the illustrative embodiment it includes at least one steerable axle 50 with hydraulic coupling. The steering device of the trailer is therein preferably electronically coupled with a steering device of the truck undercarriage 10, so that the truck undercarriage 10 and the trailer 32 can execute cornering coordinated to each other or independent of each other. A further special feature of the invention is comprised therein, that the vertical axis 20 and 38 of the boom stand 22 and the pivot mount 40 in the transport configuration on the road form the free rotation axis of the coupling member 36. Further, in the transport configuration on the road, the first articulation linkage A is freely pivotable about its articulation axis. By variation of the oil pressure in the drive cylinder of the articulation linkage A there is made possible, at the same time, the control of the axial load distribution. Since besides this the pivot mount 40 is limitedly pivotable about an axis running transverse to the trailer axis, it is achieved that the truck undercarriage 10 of the truck chassis 12 and the undercarriage 34 of the trailer 32 maintain, even when driving over a hill and during passing through of a trough, and optimal ground orientation, and further even axle load is maintained.

In the operating configuration the truck undercarriage 10 with the front part 14' of the structural frame 14 and the trailer 32 with the rearward part 14" of the structural frame are rigidly coupled to each other in the area of parting 56. The rearward part 14' of the structural frame which is located on the trailer 32 carries a pump unit 26 in the form of a two-cylinder thick matter pump with material supply container 28, which in the operating condition is on its outlet side connected with a conveyor line provided on the distribution boom 24. The truck chassis 12 and the trailer 32 are jointly supportable upon the ground 18 with lifting of their truck undercarriage 10 and undercarriage 32. For this purpose the structural frame 14 has, on its front part 14' and on its rearward part 14", hydraulically operated outrigger legs 16', 16". The drive hydraulic for the outrigger legs 16', 16" and the pump unit 26 includes a motor driven hydraulic equipment assembly or aggregate, which is provided upon the frame side part 14' of the structural frame 14. The hydraulic equipment assembly 52 is connected via flexible hydraulic lines 54 with the hydraulic drive mechanisms for the outrigger legs 16" located on the trailer 32, for the pump unit 26 and for the wheel drive.

In summary the following can be concluded. The invention concerns a movable concrete pump comprising a structural frame 14 that is mounted on a truck undercarriage 10 of a truck chassis 12, a boom stand 22 which is disposed on the structural frame 14 and can be rotated about a vertical axis 20, and a concrete distribution boom 24 embodied as a multi-member articulated boom. In order to be able to use a distribution boom having a great range, a trailer 34 is provided that has its own undercarriage 34 and is connected to the truck undercarriage 10 via a coupling member 36. The trailer 32 comprises a pivot mount 40 which is rotatable about a vertical axis 38 and accommodates the part of the set of arms that protrudes from the rear end of the truck undercarriage 10 while driving on the road. The set of arms forms the coupling member 36 and encompasses a first boom arm 1 and additional boom arms 2 to 4 that are in a folded position relative to the first boom arm.

The invention claimed is:

1. A mobile concrete pump with a structural frame (14) mounted on a truck undercarriage (10) of a truck chassis (12), the structural frame (14) supportable upon the ground (18) when lifting of the truck undercarriage (10), with a boom stand (22) rotatable about a vertical axis (20) provided upon the structural frame (14) and with a concrete distribution boom (24) in the form of a multi-element articulated boom, including a first boom arm (1) pivotable relative to the boom stand (22) via a first articulation linkage (A) about a horizontal articulation axis, and further boom arms (2 through 4) pivotable relative to each other via articulation linkages (B-D) about horizontal articulation axes, said boom foldable between a transport configuration and an operating configuration, wherein when in said transport condition a part of said multi-element articulated boom extends beyond the back end of said truck undercarriage (10), a trailer (32) connectable with the truck undercarriage (10) via a coupling member (36) in the transport configuration on the road, which includes a pivot mount rotatable about a vertical axis for receiving the part of the multi-element articulated boom extending beyond the end of the truck undercarriage (10) in the configuration of travel on the road, which multi-element articulated boom is comprised of the first boom arm (1) and the remaining boom arms (2 through 4) oriented in their folded in position relative to the first boom arm, and which forms the coupling member (36).

2. The mobile concrete pump according to claim 1, wherein the vertical axis (20, 38) of the boom stand (22) and the pivot mount (40) form the free rotation axis of the coupling member (36) in the transport configuration.

3. The mobile concrete pump according to claim 1, wherein the first articulation linkage (A) is freely pivotable about its articulation axis in the transport configuration.

4. The mobile concrete pump according to claim 1, wherein the set of arms in the transport configuration are coupled with the pivot mount pivotable about a transverse axis.

5. The mobile concrete pump according to claim 1, wherein pivot mount (40) is limitedly pivotable about an axis (46) running transverse to the trailer longitudinal axis.

6. The mobile concrete pump according to claim 1, wherein the trailer (32) is self-steering.

7. The mobile concrete pump according to claim 1, wherein the trailer (32) includes at least two, steering wheels (50).

8. The mobile concrete pump according to claim 1, wherein the trailer (32) includes a steering device coupled electronically with the steering device of the truck undercarriage (10).

9. The mobile concrete pump according to claim 1, wherein the trailer (32) includes a motorized wheel drive.

10. The mobile concrete pump according to claim 1, wherein the trailer (32) is rigidly coupleable with at least one of the truck undercarriage and structural frame (14) when in the operating configuration.

11. The mobile concrete pump according to claim 1, wherein the trailer (32) carries a pump unit with material supply container (28), which in the operating configuration is on its outlet side connectable with a conveyor line provided on the distribution boom (24).

12. The mobile concrete pump according to claim 1, wherein on the truck undercarriage section of the structural frame (14) a motor drivable hydraulic equipment assembly (52) is provided, which is connected via flexible hydraulic lines (54) with a hydraulic drive mechanism provided on the trailer (32) for supports (16) for supporting on the ground, for the pump unit (26) and for other possible users.

13. The mobile concrete pump according to claim 1, wherein the distribution boom (24) is at least four segmented.

14. The mobile concrete pump according to claim 1, wherein the set of arms in the transport configuration is bolted with the pivot mount (40) of the trailer (32).

15. The mobile concrete pump according to claim 1, wherein the trailer (32) has at least two axles.

16. The mobile concrete pump according to claim 1, wherein said steering wheels are coupled hydraulically.

17. The mobile concrete pump according to claim 10, wherein the trailer (32) together with the truck undercarriage section of the structural frame (14) is supportable upon the ground (18) with lifting of its undercarriage (34).

18. The mobile concrete pump according to claim 12, wherein the pump unit (26) is a two cylinder thick matter pump with two hydraulic drive cylinders forming the drive mechanism.

19. The mobile concrete pump according to claim 10, wherein the structural frame (14) is divided into two parts at a parting location (56), wherein the front part (14') is provided on the truck undercarriage (10) of the truck chassis and carries the distribution boom (24), the front support struts or arms (16') as well as hydraulic equipment assembly (52), and wherein the rearward part (14") is provided on the trailer (32) and carries the pump unit (26) with material supply container (28) and the rearward support struts or legs (16").

20. The mobile concrete pump according to claim 15, wherein the trailer (32) has three to five axles.

* * * * *